(12) United States Patent
Tazzia et al.

(10) Patent No.: US 10,538,664 B2
(45) Date of Patent: Jan. 21, 2020

(54) AQUEOUS THERMO-THICKENING RESIN SOLUTIONS

(71) Applicant: BASF Coatings GmbH, Muenster (DE)

(72) Inventors: Charles L. Tazzia, Grosse Pointe Farms, MI (US); Mark D. Swartzlander, Royal Oak, MI (US)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 15/511,051

(22) PCT Filed: Sep. 10, 2015

(86) PCT No.: PCT/US2015/049306
§ 371 (c)(1),
(2) Date: Mar. 14, 2017

(87) PCT Pub. No.: WO2016/044045
PCT Pub. Date: Mar. 24, 2016

(65) Prior Publication Data
US 2017/0298223 A1    Oct. 19, 2017

Related U.S. Application Data

(60) Provisional application No. 62/205,074, filed on Aug. 14, 2015, provisional application No. 62/050,290, filed on Sep. 15, 2014.

(51) Int. Cl.
*C08L 75/12* (2006.01)
*C08L 63/00* (2006.01)
*C08L 71/00* (2006.01)

(52) U.S. Cl.
CPC .............. *C08L 75/12* (2013.01); *C08L 63/00* (2013.01); *C08L 71/00* (2013.01)

(58) Field of Classification Search
CPC ....................................................... C08L 75/12
See application file for complete search history.

(56) References Cited

U.S. PATENT DOCUMENTS

| | | |
|---|---|---|
| 6,417,292 B1 | 7/2002 | Moriarity et al. |
| 6,437,055 B1 | 8/2002 | Moriarity et al. |
| 2003/0001135 A1* | 1/2003 | Gerlitz .............. C08G 59/184 252/182.13 |
| 2003/0054193 A1* | 3/2003 | McCollum ............ B05D 7/52 428/626 |
| 2007/0269660 A1* | 11/2007 | Killilea .............. C04B 41/009 428/414 |
| 2008/0119613 A1* | 5/2008 | Klein .................. B01F 17/0042 525/187 |
| 2008/0188591 A1* | 8/2008 | Raymond ............ C08G 59/184 523/416 |
| 2009/0199994 A1* | 8/2009 | Amano .................. C09K 5/063 165/10 |
| 2009/0261298 A1* | 10/2009 | Kondo ................. C08G 59/188 252/500 |

FOREIGN PATENT DOCUMENTS

| | | |
|---|---|---|
| EP | 0 672 739 A1 | 9/1995 |
| JP | 6-9848 A | 1/1994 |

OTHER PUBLICATIONS

International Preliminary Report on Patentability and Written Opinion dated Mar. 21, 2017 in PCT/US2015/049306 filed Sep. 10, 2015.
International Search Report dated Nov. 26, 2015 in PCT/US2015/049306 filed Sep. 10, 2015.

* cited by examiner

*Primary Examiner* — Megan McCulley
(74) *Attorney, Agent, or Firm* — Oblon, McClelland, Maier & Neustadt, L.L.P.

(57) ABSTRACT

Provided are aqueous resin solutions having unique rheologies and products incorporating the same. The water-based materials provided herein are thermo-thickening, and the materials increase dramatically in viscosity (at least 100 times) in a desired temperature range increase (20 C to <100 C) at ambient pressure. Suitable resins comprising a hydrophobic group and a hydrophilic group may be selected from an epoxy resin, a phenol-formaldehyde resin, a polyurethane resin, an acrylic resin, a polyester resin, an acrylic-urethane resin, a melamine resin, a melamine-formaldehyde resin, an amino resin, and combinations thereof. A specific epoxy functional resin/polymer suitable for the resin solutions are prepared by reacting (A) an epoxy pre-polymer of (1) one or more polyols and (2) one or more epoxy functional materials with (B) a di- or polyamine, thereby forming the aqueous thermo-thickening resin solution. The resin solutions are substantially free of cross-linking agents.

13 Claims, 8 Drawing Sheets

AQUEOUS THERMO-THICKENING RESIN SOLUTIONS

TECHNICAL FIELD

The present invention is directed to aqueous thermo-thickening resin solutions whose viscosities increase significantly within a relatively small temperature range increase. The viscosity properties are reversible. Such properties may be tuned for desired viscosity changes over desired temperatures. These solutions may be used for non-coatings applications such as products that contact the human body including various apparel, orthopedic goods, and personal protection items, and such as products that encounter temperature increases, modest or extreme, during use such as compositions used in the oilfield industry and used in batteries.

BACKGROUND

Various resins are known, including epoxy resins suitable for electrocoating applications. For example, reaction products of epoxy-polyester and amine are disclosed in U.S. Pat. Nos. 6,437,055 and 6,417,292 and are for providing chip resistance and reduced cratering. In general, epoxy resins are a reaction product of an epoxy functional pre-polymer and a compound containing active hydrogen functionality (e.g. amines, hydroxyls, carboxylic and/or mineral acids), optionally with a catalyst. A cross-linking agent is added to the reaction product and a dispersion in water is formed. The dispersion has a cloudy character, meaning that the reaction product and the cross-linking agent are generally suspended and not entirely dissolved in the water. Resin dispersions have many applications, including forming coatings. The cross-linking agent provides strength to a coating upon application and curing of a resin dispersion. Such cross-linking agents may be chosen as desired for given applications, but certain cross-linking agents, for example toluene diisocyanate, are hazardous and elimination of their handling in large quantities in a manufacturing facility is desirable.

There is a need to provide products for delivering and utilizing resins that are environmentally friendly and are easily handled and that provide unique rheological properties.

SUMMARY

Provided are resin-based products that are environmentally friendly and are easily handled. In addition, the resin-based products provided herein, specifically resin solutions and products incorporating the same, provide beneficial rheological properties. It has been found that omission of cross-linking agents during formation of traditional resin coating dispersions, such as those containing both a hydrophobic group and a hydrophilic group, for example epoxy resins and/or polyurethane resins, results in resin solutions having desirable properties in many non-coating applications, which are applications other than those used to make polymeric coatings on substrates.

Suitable resins containing both a hydrophobic group and a hydrophilic group for use in the resin solutions of the present invention include but are not limited to epoxy resins, phenol-formaldehyde resins, polyurethane resins, acrylic resins, polyester resins, acrylic-urethane resins, melamine resins, melamine-formaldehyde resins, amino resins, and combinations thereof. Basic resin chemistries are known in the art. For example, epoxy functional resins/polymers suitable for use in the resin solutions of the present invention can be prepared by reacting (A) an epoxy pre-polymer of (1) one or more polyols and (2) one or more epoxy functional materials with (B) a di- or polyamine. Upon dissolution of the resin in water, an aqueous thermo-thickening resin solution is formed. Such solutions exhibit unique rheological properties such as thermo-thickening where the viscosities of the solutions increase significantly within a desired temperature range increase. The viscosity properties are reversible. Such properties may be tuned for desired viscosity changes over desired temperatures, modest or extreme. These solutions may be used for non-coatings applications such as products that contact the human body and that encounter temperature fluctuations during use such as in the oilfield industry and in batteries.

The rheology of the resin solutions is impacted by factors such as starting polymers, non-volatiles (NV) content, total neutralization (TN), and organic solvent content. There are unlimited combinations of these factors, which may be tailored to specific applications.

In a first aspect, an aqueous thermo-thickening resin solution for non-coating applications comprises: a resin comprising a hydrophobic group and a hydrophilic group, the resin being selected from an epoxy resin, a phenol-formaldehyde resin, a polyurethane resin, an acrylic resin, a polyester resin, an acrylic-urethane resin, a melamine resin, a melamine-formaldehyde resin, an amino resin, and combinations thereof; and water; optionally, a salting component; the solution being substantially free of a cross-linking agent; wherein the solution exhibits a dynamic viscosity increase of at least 100 times in a temperature range from 20° C. to <100° C. at ambient pressure (or to 99° C., 98° C., 97° C., 96° C., 95° C., 90° C., 85° C., 80° C., 75° C., 70° C., 65° C., 60° C., 55° C., 50° C., 45° C., or even 40° C.). The aqueous thermo-thickening resin solution may comprise by weight: the resin in the range of 0.5-60%; water in the range of 40-99.5%; and organic volatiles in the range of 0-25%. The aqueous thermo-thickening resin solution may comprise an acid content in the range of 0.31 to 0.80 milliequivalents acid/g non-volatiles. When the salting component is present, it may be selected from the group consisting of organic acids, mineral acids, and nitrogen-containing compounds.

The resin may be a reaction product of (A) an epoxy pre-polymer comprising an aromatic polyol and an epoxy functional material and (B) a di- or polyamine. The aromatic polyol may comprise a diphenylmethane derivative. The epoxy functional material may comprise a di- or polyglycidyl ether of a polyhydric alcohol. The di- or polyamine may comprise a polyoxyalkylene amine. In a detailed embodiment, the aromatic polyol may comprise bisphenol A (Bis A), the epoxy functional material may comprise diglycidyl ether of bisphenol A (DGEBA), and the di- or polyamine may comprise polyether amine. The aqueous thermo-thickening resin solution may comprise by weight: the reaction product in the range of 0.5-60%; water in the range of 40-99.5%; and organic volatiles in the range of 0-25%; wherein the percent neutralization is in the range of 40-110%. The number average molecular weight may be in the range of 7,500 to 150,000 Daltons.

The aqueous thermo-thickening resin solution may comprise blocks of hydrophobic groups and blocks of hydrophilic groups. In one or more embodiments, a ratio of number average molecular weights of hydrophobic to hydrophilic units in the resin is <2.5, or even <2.0, or <1.5, or <1.4, or <1.3, or <1.2, or <1.1, or <1.0, or in the range of 0.01-0.99, 0.1-0.9, 0.15-0.8, 0.20-0.75, or 0.25-0.7.

In the temperature range of 20° C. to <100° C. at ambient pressure, the dynamic viscosity of the aqueous thermo-thickening resin solution may display at least one maximum, which may be referred to as a thermo-thickening temperature.

Another aspect provides a temperature-sensitive product comprising: any of the aqueous thermo-thickening resin solutions disclosed herein; and a carrier for the aqueous thermo-thickening resin solution. The carrier may comprise a liquid-impermeable pouch or a plurality of shells of microcapsules and a surface of the product becomes more supportive upon contact with a living body. The temperature-sensitive product may be in the form of one or more of the following: personal wearables, household items, and transportation or public seating.

The carrier may comprise another liquid and the product thickens during use at temperatures elevated from ambient temperature. The temperature-sensitive product may be in the form of an injectable solution for enhanced oil recovery. The temperature-sensitive product may be in the form of an electrolyte solution for battery cells. The temperature-sensitive product may be an industrial fluid and the resin of the aqueous thermo-thickening resin solution is effective as a rheology control agent.

The temperature-sensitive product may be effective to absorb energy, thereby providing protection to an item in its proximity.

A further aspect is a method of making an aqueous thermo-thickening resin solution for non-coating applications, the method comprising: forming a resin comprising a hydrophobic group and a hydrophilic group, the resin being selected from an epoxy resin, a phenol-formaldehyde resin, a polyurethane resin, an acrylic resin, a polyester resin, an acrylic-urethane resin, a melamine resin, a melamine-formaldehyde resin, an amino resin, and combinations thereof; and dissolving the resin in water, and optionally, a salting component, in the substantial absence of a cross-linking agent; thereby forming the aqueous thermo-thickening resin solution that exhibits a kinematic viscosity increase of at least 100 times in a temperature range of 20° C. to <100° C. at ambient pressure.

Another aspect is a method of providing a temperature-sensitive product for non-coatings applications, the method comprising: obtaining any aqueous thermo-thickening resin solution disclosed herein; incorporating the aqueous thermo-thickening resin solution with a carrier; and forming the temperature-sensitive product whose structure changes upon a temperature change to 40-<100° C. at ambient pressure.

Another aspect is a method of absorbing energy, the method comprising: obtaining any temperature-sensitive product disclosed herein; and associating the temperature-sensitive product with an item in the proximity of the temperature-sensitive product such that upon contact with an energy source, the temperature-sensitive product thickens and the item remains substantially intact.

Also provided are uses of an aqueous thermo-thickening resin solution in non-coating applications to provide a dynamic viscosity increase of at least 100 times in a temperature range from 20° C. to <100° C. at ambient pressure.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Provided are aqueous resin solutions having unique rheologies and products incorporating the same. That is, the water-based materials provided herein provide a property of known as thermo-thickening. Instead of dropping moderately in viscosity with increasing temperature, they increase dramatically in viscosity in a temperature range, for example from room temperature (e.g., 20-25° C.) up to 100° C. Using a variety of formulation parameters, the response to temperature can be tuned. This phenomenon is completely reversible, and the materials return to the original viscosity when the temperature drops back down to the original temperature range. The fact that these resin solutions are water-based, and that the viscosity transition happens in a temperature range (20-<100° C.) that can be tailored to a desired smaller range, give the resin solutions several potential applications.

The following terms shall have, for the purposes of this application, the respective meanings set forth below.

A "solution" means a clear single phase liquid having two or more ingredients where one is substantially dissolved in the other. For example, an aqueous resin solution means that the resin is substantially dissolved in water such that upon visual inspection, only one phase is present.

A "dispersion" means a cloudy material having at least two phases where one ingredient is suspended or dispersed in the other. For example, an aqueous resin dispersion means that the resin is suspended in water such that upon visual inspection, the dispersion is not clear.

An "aromatic group" refers to a compound having a conjugated ring of unsaturated bonds, lone pairs, or empty orbitals. In specific instances, an aromatic group means a ringed-hydrocarbon having alternating double and single bonds between carbon atoms.

A "hydrophilic group" means a group with adequate or ample oxygen and/or nitrogen and/or electronegative moiety content that renders it able to interact with polar liquids through, for example, hydrogen bonding.

A "hydrophobic group" means a group that is aliphatic or aromatic and generally free of electronegative moieties (oxygen, nitrogen, and the like) that does not interact with polar liquids.

A "salting component" means a compound that dissociates in water and forms a salt with the resin. Exemplary salting components are organic acids such as acetic acid, mineral acids such as sulfuric acid, bases such as sodium hydroxide, and nitrogen-containing compounds such as amines and ammonia.

"Substantially free of a cross-linking agent" means that no material suitable for cross-linking the resin is intentionally added to the solution. Thus, the presence of traces of such an agent due to minor cross-contamination or accidental inclusion does not preclude the solution from being substantially free of the agent.

"Substantially free of an organic solvent" or "organic volatile" means that most organic solvent used during polymerization is removed, by, for example, vacuum stripping. Residual organic solvent may be present in amounts of up to 5 weight-%, or even 3 weight-%. Also, no organic solvent material is intentionally added to the solution. Thus, the presence of traces of such a solvent due to minor cross-contamination or accidental inclusion does not preclude the solution from being substantially free of the solvent. Volatile organic content (VOC) refers to the content of organic volatiles, this number excludes water content.

"Non-volatiles (NV) content" refers to the content of material that does not evaporate at ambient or room temperature (e.g. 20-25° C. (68-77° C.)). Non-volatiles content is typically measured by ASTM method: D-2369, one hour at 110° C. For a resin solution comprising resin and water and organic volatiles, the non-volatiles (NV) content refers to the resin content, and may include a non-volatile salting component, which excludes the water and organic volatiles content.

"Total neutralization" (TN) is the number of equivalents of salting sites that are neutralized. For resins having an amine co-reactant, for example, TN refers to the number of equivalents of nitrogen (N) neutralized. Percent neutralization is the percent of such salting sites that are neutralized.

"Dynamic viscosity" refers to the resistance of a fluid to shear stress. Dynamic viscosity may be measured by a Rheometric Scientific Shear Stress Controlled Rheometer (SR-2000), having a Couette geometry (cup=32 mm, bob=29.64 mm, cup length=44.25 mm), a Dynamic Temperature Ramp, Stress=60 Pa, Frequency=10 rad/sec, Temperature range=25-75° C., Rate=2° C./min, and time per measurement=10 seconds.

"Temperature-sensitive product" is any item whose structure changes with a change in temperature, for example, personal wearables, household items, transportation and/or public seating that adjust once in contact with body temperature or even simply polymer-containing compositions that adjust to changes in environmental temperatures. A temperature-sensitive product comprises the resin solutions disclosed herein along with a carrier. Reference to a carrier herein means something in addition to the resin solution used to deliver or contain the resin solution for a particular application. For example, the resin solution may be packaged in a carrier that is one or more liquid-impermeable pouches or that is a plurality of shells that encapsulate the resin solutions thereby forming microcapsules, which are in turn incorporated into a solid final product. Or, the carrier may be another liquid such as an inert diluent or another polymer solution or a surfactant solution or an electrolyte solution, and the final product is in liquid form.

"Ambient pressure" means atmospheric pressure (1 atm) which may vary slightly ±5% or even 2.5%, or even 1%.

A "personal wearable" is any kind of apparel, orthopedic, and/or personal protection items that is worn on a living being's body. Such wearables include but are not limited to: articles of clothing or footwear, particularly athletic shoes; military issue garments including uniforms, vests, and body armor; orthopedic goods, for example, braces for knees, wrists, backs, and elbows.

"Household items" are those items used regularly by household members including but not limited to furniture (sofas, chairs) and bedding (pillows, mattresses, blankets).

"Transportation and/or public seating" refers to benches or seats used in personal vehicles, trucks, subways, trains, airplanes, boats, and the like, and in public places as stadiums, ball fields, and parks.

Aqueous polymer-containing compositions may have many uses. An exemplary composition is one that may be used to plug wells deep below the earth's surface. Another composition is a hydraulic cement slurry. Another further such composition is an polymer-containing composition used for flooding during enhanced oil recovery (EOR) operations.

With respect to electrolyte solutions, as used, for example, in batteries, a resin solution as disclosed may be combined with an electrolyte solution to thicken should an exothermic chemical reaction take-off.

Materials and Preparation

Resins comprising a hydrophobic group and a hydrophilic group may selected from any of the following: an epoxy resin, a phenol-formaldehyde resin, a polyurethane resin, an acrylic resin, a polyester resin, an acrylic-urethane resin, a melamine resin, a melamine-formaldehyde resin, an amino resin, and combinations thereof.

Basic resin synthesis includes: reaction one or more an electrophilic pre-polymers with a co-reactant having active hydrogen functionality. The pre-polymers generally contain functional groups such as epoxys and isocyanates. The co-reactants are typically polyfunctional amines, carboxylic and/or mineral acids (and acid anhydrides), and alcohols.

An exemplary epoxy functional resin/polymer suitable for use in the resin solutions of the present invention may be prepared by reacting in water: (A) an epoxy pre-polymer of (1) one or more aromatic polyols and (2) one or more epoxy functional materials with (B) a di- or polyamine that are hydrophilic in the optional presence of a catalyst and in the absence of a cross-linking agent, thereby forming an aqueous thermo-thickening resin solution. Choice of the hydrophobic compound can be made according to the chemical functionality and/or performance desired.

Suitable epoxy-functional materials may contain at least one epoxy or oxirane group in the molecule, such as di- or polyglycidyl ethers of polyhydric alcohols. Preferably, the epoxy-functional material contains at least two epoxy groups per molecule. Suitable polyepoxide reactants include, without limitation, diglycidyl aromatic compounds such as the diglycidyl ethers of polyhydric phenols such as 2,2-bis(4-hydroxyphenyl)propane (bisphenol A), 2,2-bis(4-hydroxy-3-methylphenyl)propane, 4,4'-dihydroxybenzophenone, dihydroxyacetophenones, 1,1-bis(4hydroxyphenylene)ethane, bis(4-hydroxyphenyl)methane, 1,1-bis (4hydroxyphenyl)isobutane, 2,2-bis(4-hydroxy-tert-butylphenyl)propane, 1,4-bis(2-hydroxyethyl)piperazine, 2-methyl-1,1-bis(4-hydroxyphenyl)propane, bis-(2-hydroxynaphthyl)methane, 1,5-dihydroxy-3-naphthalene, and other dihydroxynaphthylenes, catechol, resorcinol, and the like. Also suitable are the diglycidyl ethers of aliphatic diols, including the diglycidyl ethers of 1,4-butanediol, cyclohexanedimethanols, ethylene glycol, propylene glycol, diethylene glycol, dipropylene glycol, triethylene glycol, tripropylene glycol, polypropylene glycol, polyethylene glycol, poly(tetrahydrofuran), 1,3-propanediol, 2,2,4-trimethyl-1,3-pentanediol, 1,6-hexanediol, 2,2-bis(4-hydroxycyclohexyl)propane, and the like. Diglycidyl esters of dicarboxylic acids can also be used as polyepoxides. Specific examples of compounds include the diglycidyl esters of oxalic acid, cyclohexanediacetic acids, cylcohexanedicarboxylic acids, succinic acid, glutaric acid, phthalic acid, terephthalic acid, isophthalic acid, naphthalene dicarboxylic acids, and the like. A polyglycidyl reactant may be used, preferably in a minor amount in combination with diepoxide reactant. Novolac epoxies may be used as a polyepoxide-functional reactant. The novolac epoxy resin may be selected from epoxy phenol novolac resins or epoxy cresol novolac resins. Other suitable higher-functionality polyepoxides are glycidyl ethers and esters of triols and higher polyols such as the triglycidyl ethers of trimethylolpropane, trimethylolethane, 2,6-bis(hydroxymethyl)-p-cresol, and glycerol; tricarboxylic acids or polycarboxylic acids. Also useful as polyepoxides are epoxidized alkenes such as cyclohexene oxides and epoxidized fatty acids and fatty acid derivatives such as epoxidized soybean oil. Other useful polyepoxides include, without limitation, polyepoxide polymers such as acrylic, polyester, polyether, and epoxy resins and polymers, and epoxy-modified polybutadiene, polyisoprene, acrylobutadiene nitrile copolymer, or other epoxy-modified rubber-based polymers that have a plurality of epoxide groups. A preferred epoxy functional material is diglycidyl ether of bisphenol A (Bis A).

Suitable aromatic polyols have an average functionality of at least two. The aromatic polyol may contain mono-functional, di-functional, tri-functional, and higher functional alcohols. The aromatic polyol may have one, two, three, or more aromatic rings. In one or more embodiments, diols are used, but when branching is desired, higher functionality aromatic alcohols are included. Exemplary aromatic polyols include polyhydric phenols such as 2,2-bis(4-hydroxyphenyl)propane (bisphenol A), 2,2-bis(4-hydroxy-3-methylphenyl)propane, 4,4'-dihydroxybenzophenone, dihydroxyacetophenones, 1,1-bis(4hydroxyphenylene)ethane, bis(4-hydroxyphenyl)methane, 1,1-bis(4hydroxyphenyl) isobutane, 2,2-bis(4-hydroxy-tert-butylphenyl)propane, 1,4-bis(2-hydroxyethyl)piperazine, 2-methyl-1,1-bis(4-hydroxyphenyl)propane, bis-(2-hydroxynaphthyl)methane, 1,5-dihydroxy-3-naphthalene, and other dihydroxynaphthylenes, catechol, resorcinol, and the like. A preferred aromatic polyol is bisphenol A.

Useful catalysts for forming the pre-polymer include any that activate an oxirane ring, such as tertiary amines or quaternary ammonium salts (e.g., benzyldimethylamine, dimethylaminocyclohexane, triethylamine, N-methylimidazole, tetramethyl ammonium bromide, and tetrabutyl ammonium hydroxide.), tin and/or phosphorous complex salts (e.g., $(CH_3)_3$ SNI, $(CH_3)_4$ PI, triphenylphosphine, ethyltriphenyl phosphonium iodide, tetrabutyl phosphonium iodide) and so on.

Exemplary di- and polyamines include, but are not limited to polyamines, including diamines such as ethylenediamine, diethylenetriamine, triethylenetetramine, dimethylaminopropylamine, dimethylaminobutylamine, diethylaminopropylamine, diethylaminobutylamine, dipropylamine, and piperizines such as 1-(2-aminoethyl)piperazine, polyalkylenepolyamines such as triethylenetetramine, tetraethylenepentamine, pentaethylenehexamine, tripropylenetetramine, tetrapropylenepentamine, pentapropylenehexamine, N,N'-bis(3-aminopropyl)ethylenediamine, N-(2-hydroxyethyl)propane-1,3-diamine, and polyoxyalkylene amines such as those available from BASF SE under the tradename BAXXODUR® or from Huntsman under the trademark JEFFAMINE® (polyether amine).

An exemplary epoxy pre-polymer comprises bisphenol A (Bis A) and the diglycidyl ether of bisphenol A (DGEBA) formed using a phosphine catalyst (e.g. triphenylphosphine), having an equivalent weight of about 490-530. The pre-polymer may be reduced to about 70-80% non-volatile (NV) content in an organic solvent for ease of handling. An exemplary polyamine is a polyether amine that is amine functional on both ends, for example, polyether amine. This polyether amine is heated to 90° C., and then the epoxy pre-polymer is added such that the amine/epoxy ratio is in the range of approximately 1.3-1.4. The mixture is heated to 115-120° C. and reacted until it is just below the gel point. Organic solvents can be left in, or stripped out by vacuum distillation during the reaction.

Once the reaction has proceeded and the resin is just below the gel point, the resin solution is made by transferring the hot resin to a solution of water and an acid under agitation. In certain applications, the concentration of the acid is such that the neutralization of the resin with the acid is at least 40%. The final solution may have a non-volatile content in the range of 25 weight % to 75 weight % NV. The non-volatile content is tailored to final uses. It is this resin solution that exhibits the thermo-thickening. The aforementioned thermo-thickening property of these resin solutions is unique in both its occurrence and magnitude. In one or more embodiments, the viscosity increases by 100 times between 25-40° C. (77-104° F.), and then again at temperatures above 50° C. (122° F.).

Formulation parameters such as (but not limited to) % neutralization (or total neutralization—TN), % non-volatiles (NV), and the addition of low levels of organic solvent can be used to tune the viscosity response to a certain degree.

Sample Product Specifications are:
% NV Range: 25-50% by weight;
Density: 1.008-1.056 (g/ml)
Weight per gallon: 8.4-8.8;
Milliequivalents acid/g NV: 0.31-0.80;
Milliequivalents base/g NV: 0.64-0.80; and
Molecular weight (number average) ($M_n$): 7,500-150,000 Daltons.

Applications

Thermo-thickening resin solutions may be suitable for many applications that are not related to the formation of coatings. Of interest are those applications that include exposure to temperature changes to take advantage of the thermo-thickening properties. Some examples include products that contact the human body and that encounter temperature fluctuations during use such as in the oilfield industry and in batteries.

Thermo-thickening resin solutions may be suitable for energy absorption for military applications. Because the viscosity transition happens in human body temperature range and continues to increase in temperature ranges commonly seen in conflict areas, these resin solutions may be able to supplement the body armor used by soldiers. In addition, they may have application in protecting military vehicles or stationary equipment such as fuel tanks from explosive and/or incendiary devices. The high viscosity could help dampen shock waves from explosions, and high water content (~60%) could help absorb thermal energy from incendiary devices.

Another potential application is for energy absorption in shoes, particularly athletic shoes. One complaint about athletic shoes is that while they offer the needed support during strenuous activities, they are not comfortable during normal use. The tunable thermo-thickening resin solution in the soles of the shoes may solve this problem by increasing in viscosity (and therefore support) as activity level and foot temperature increase, and then relaxing to a softer state when foot temperature drops.

Similarly, the materials may have application in support braces (e.g. knee, back, elbow, and the like), again, by increasing the level of support as body temperature increases.

Still another potential application is in oilfield services. In oil and gas wells, the temperatures typically increase as one drills deeper below the surface. Should the need arise to plug such a well, the thermo-thickening resin solution (alone, or mixed with other materials) could be pumped down the well at ambient temperatures (and low viscosity) and then thicken deep in the well to plug it. Also with respect to oil wells, temperature sensitive polymers may used for flooding during enhanced oil recovery (EOR) operations in, for example alkaline-surfactant-polymer (ASP) compositions.

In addition, the resin solutions may be used as rheology control agents in industrial fluids.

Still another application is in transportation and/or public and/or household seating to enhance comfort by conforming to body shape and then holding that shape.

Before describing several exemplary embodiments of the invention, it is to be understood that the invention is not limited to the details of construction or process steps set forth in the following description. The invention is capable of other embodiments and of being practiced in various ways.

Embodiments

Various embodiments are listed below. It will be understood that the embodiments listed below may be combined with all aspects and other embodiments in accordance with the scope of the invention.

Embodiment 1. An aqueous thermo-thickening resin solution for non-coating applications comprising (A) a resin comprising a hydrophobic group and a hydrophilic group, the resin being selected from an epoxy resin, a phenol-formaldehyde resin, a polyurethane resin, an acrylic resin, a polyester resin, an acrylic-urethane resin, a melamine resin, a melamine-formaldehyde resin, an amino resin, and combinations thereof; and (B) water; (C) optionally, a salting component; (D) the solution being substantially free of a cross-linking agent; wherein the solution exhibits a dynamic viscosity increase of at least 100 times in a temperature range from 20° C. to <100° C. at ambient pressure.

Embodiment 2. The aqueous thermo-thickening resin solution of embodiment 1, wherein the resin is a reaction product of (A) an epoxy pre-polymer comprising an aromatic polyol and an epoxy functional material and (B) a di- or polyamine.

Embodiment 3. The aqueous thermo-thickening resin solution of embodiment 2, wherein the aromatic polyol comprises a diphenylmethane derivative.

Embodiment 4. The aqueous thermo-thickening resin solution of any of embodiments 2-3, wherein the epoxy functional material comprises a di- or polyglycidyl ether of a polyhydric alcohol.

Embodiment 5. The aqueous thermo-thickening resin solution of any of embodiments 2-4, wherein the di- or polyamine comprises a polyoxyalkylene amine.

Embodiment 6. The aqueous thermo-thickening resin solution of embodiment 2, wherein the aromatic polyol comprises bisphenol A (Bis A), the epoxy functional material comprises diglycidyl ether of bisphenol A (DGEBA), and the di- or polyamine comprises polyether amine.

Embodiment 7. The aqueous thermo-thickening resin solution of any of embodiments 1-6, wherein the salting component is present and is selected from the group consisting of organic acids, mineral acids, and nitrogen-containing compounds.

Embodiment 8. The aqueous thermo-thickening resin solution of any of embodiments 1-7 comprising by weight: the resin in the range of 0.5-60%; water in the range of 40-99.5%; and organic volatiles in the range of 0-25%.

Embodiment 9. The aqueous thermo-thickening resin solution of any of embodiments 1-6 comprising by weight: the reaction product in the range of 0.5-60%; water in the range of 40-99.5%; and organic volatiles in the range of 0-25%; wherein the percent neutralization is in the range of 40-110%.

Embodiment 10. The aqueous thermo-thickening resin solution of any of embodiments 1-6 comprising a number average molecular weight in the range of 7,500 to 150,000 Daltons.

Embodiment 11. The aqueous thermo-thickening resin solution of any of embodiments 1-10 wherein the resin comprises a ratio of number average molecular weights of hydrophobic to hydrophilic units in the resin is <2.5, or even <2.0, or <1.5, or <1.4, or <1.3, or <1.2, or <1.1, or <1.0, or in the range of 0.01-0.99, 0.1-0.9, 0.15-0.8, 0.20-0.75, or 0.25-0.7.

Embodiment 12. A temperature-sensitive product comprising: the aqueous thermo-thickening resin solution of any one of embodiments 1-11; and a carrier for the aqueous thermo-thickening resin solution.

Embodiment 13. The temperature-sensitive product of embodiment 12, wherein the carrier comprises a liquid-impermeable pouch or a plurality of shells of microcapsules; and wherein a surface of the product becomes more supportive upon contact with a living body.

Embodiment 14. The temperature-sensitive product of any of embodiments 12-13 in the form of one or more of the following: personal wearables, household items, and transportation or public seating.

Embodiment 15. The temperature-sensitive product of any of embodiments 12-14, wherein the carrier comprises another liquid; and wherein the product thickens during use at temperatures elevated from ambient temperature.

Embodiment 16. The temperature-sensitive product of embodiment 15 in the form of an injectable solution for enhanced oil recovery.

Embodiment 17. The temperature-sensitive product of embodiment 15 in the form of an electrolyte solution for battery cells.

Embodiment 18. The temperature-sensitive product of embodiment 12 that is effective to absorb energy, thereby providing protection to an item in its proximity.

Embodiment 19. The temperature-sensitive product of embodiment 15 that is an industrial fluid and the resin of the aqueous thermo-thickening resin solution is effective as a rheology control agent.

Embodiment 20. A method of making an aqueous thermo-thickening resin solution for non-coating applications, the method comprising: (A) forming a resin comprising a hydrophobic group and a hydrophilic group, the resin being selected from an epoxy resin, a phenol-formaldehyde resin, a polyurethane resin, an acrylic resin, a polyester resin, an acrylic-urethane resin, a melamine resin, a melamine-formaldehyde resin, an amino resin, and combinations thereof; and (B) dissolving the resin in water, and optionally, a salting component, in the substantial absence of a cross-linking agent; thereby forming the aqueous thermo-thickening resin solution that exhibits a kinematic viscosity increase of at least 100 times in a temperature range of 20° C. to <100° C. at ambient temperature.

Embodiment 21. The method of embodiment 20, wherein the resin is a reaction product of (A) an epoxy pre-polymer comprising an aromatic polyol and an epoxy functional material and (B) a di- or polyamine Embodiment 22. The method of embodiment 21, wherein the aromatic polyol comprises bisphenol A (Bis A), the epoxy functional material comprises diglycidyl ether of bisphenol A (DGEBA), and the di- or polyamine comprises polyether amine.

Embodiment 23. A method of providing a temperature-sensitive product for non-coatings applications, the method comprising: obtaining the aqueous thermo-thickening resin solution of any one of embodiments 1-11; incorporating the aqueous thermo-thickening resin solution with a carrier; and forming the temperature-sensitive product whose structure changes upon a temperature change to 40-<100° C. at ambient pressure.

Embodiment 24. The method of embodiment 23, wherein the carrier comprises a liquid-impermeable pouch or a plurality of shells of microcapsules and the temperature-sensitive product is effective to provide support to a living being's body.

Embodiment 25. The method of embodiment 23, wherein the carrier comprises another liquid and the temperature-sensitive product is effective for industrial fluids or for oil wells and/or drilling or for batteries.

Embodiment 26. A method of absorbing energy, the method comprising: obtaining the temperature-sensitive product of any one of embodiments 12-19; and associating the temperature-sensitive product with an item in the proximity of the temperature-sensitive product such that upon contact with an energy source, the temperature-sensitive product thickens and the item remains substantially intact.

Embodiment 27. Use of an aqueous thermo-thickening resin solution in non-coating applications to provide a dynamic viscosity increase of at least 100 times in a temperature range from 20° C. to <100° C. at ambient pressure.

EXAMPLES

The following examples were prepared and tested at ambient pressure.

Example 1

An epoxy precursor polymer was made as follows. 908.6 grams of diglycidyl ether of bisphenol A (Bis A) and 285 grams of Bis A were mixed in a reaction vessel under a nitrogen ($N_2$) blanket, heated to 125° C., and 0.5 grams of catalyst triphenylphosphine were added to the reaction vessel. The reaction exothermed to 190-200° C. The material was cooled to 177° C. and held at that temperature for 1 hour. The equivalent weight of the pre-polymer was 475-540. The material was cooled to 150° C. and, 100 grams of isobutanol and 308 grams of toluene were added slowly.

Example 2

679.1 grams of polyether amine was added to a reaction vessel under a nitrogen ($N_2$) blanket, heated to 90° C., and 321 grams of the pre-polymer of Example 1 were added. The mixture was heated to 115-120° C., vacuum stripped and solvent was collected, holding at 120° C. for 3-4 hours. The mixture was kept below the gel point, which was an equivalents ratio of approximately 1.36:1 amine:epoxy. The resulting resin was transferred to an acetic acid and water solution to form the resin solution. No cross-linking agents were present.

Figure 1:
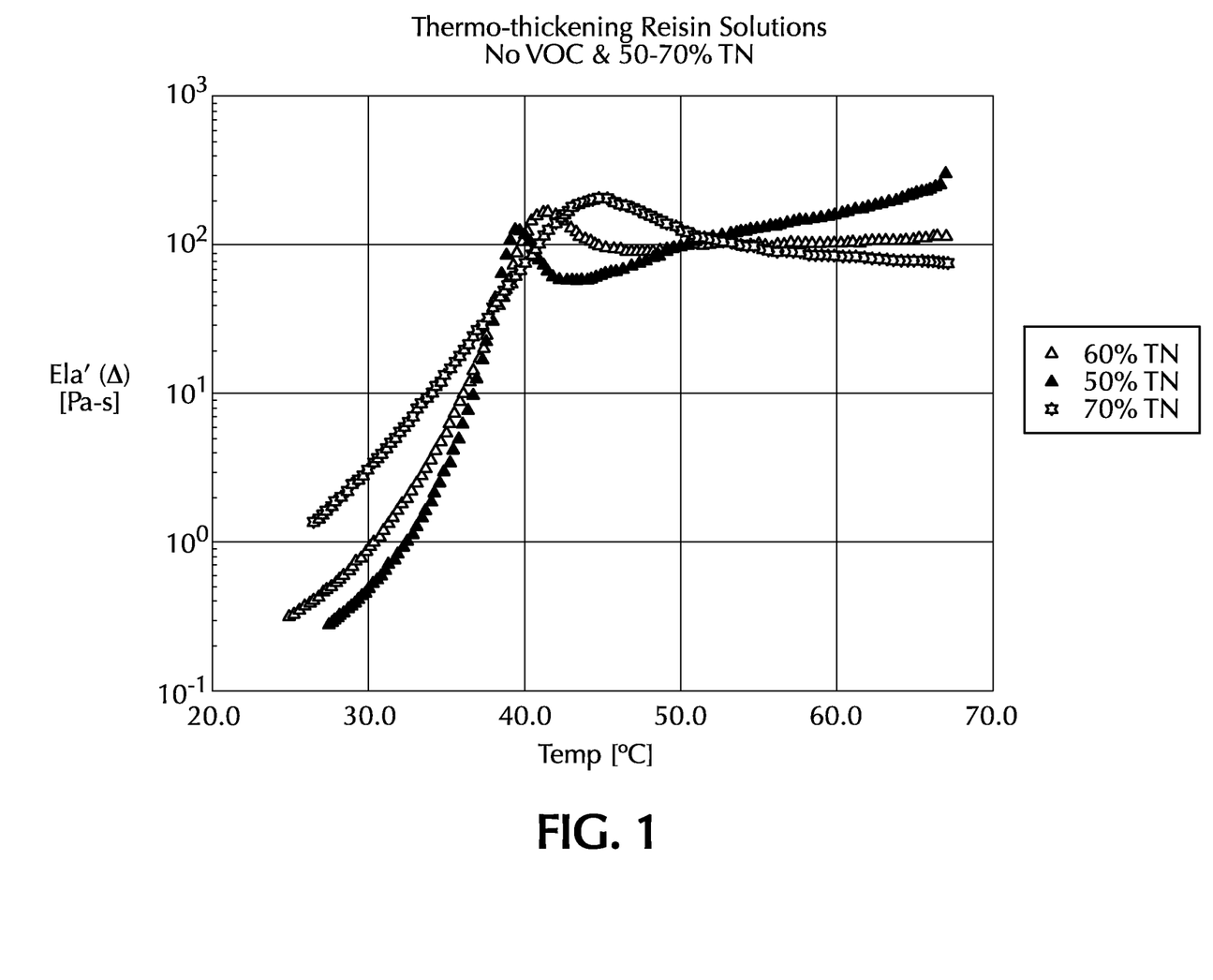
FIG. 1 is a log-plot of viscosity versus temperature of exemplary thermo-thickening resin solutions having no volatiles and a total neutralizations of 50, 60, and 70%.
Figure 2:
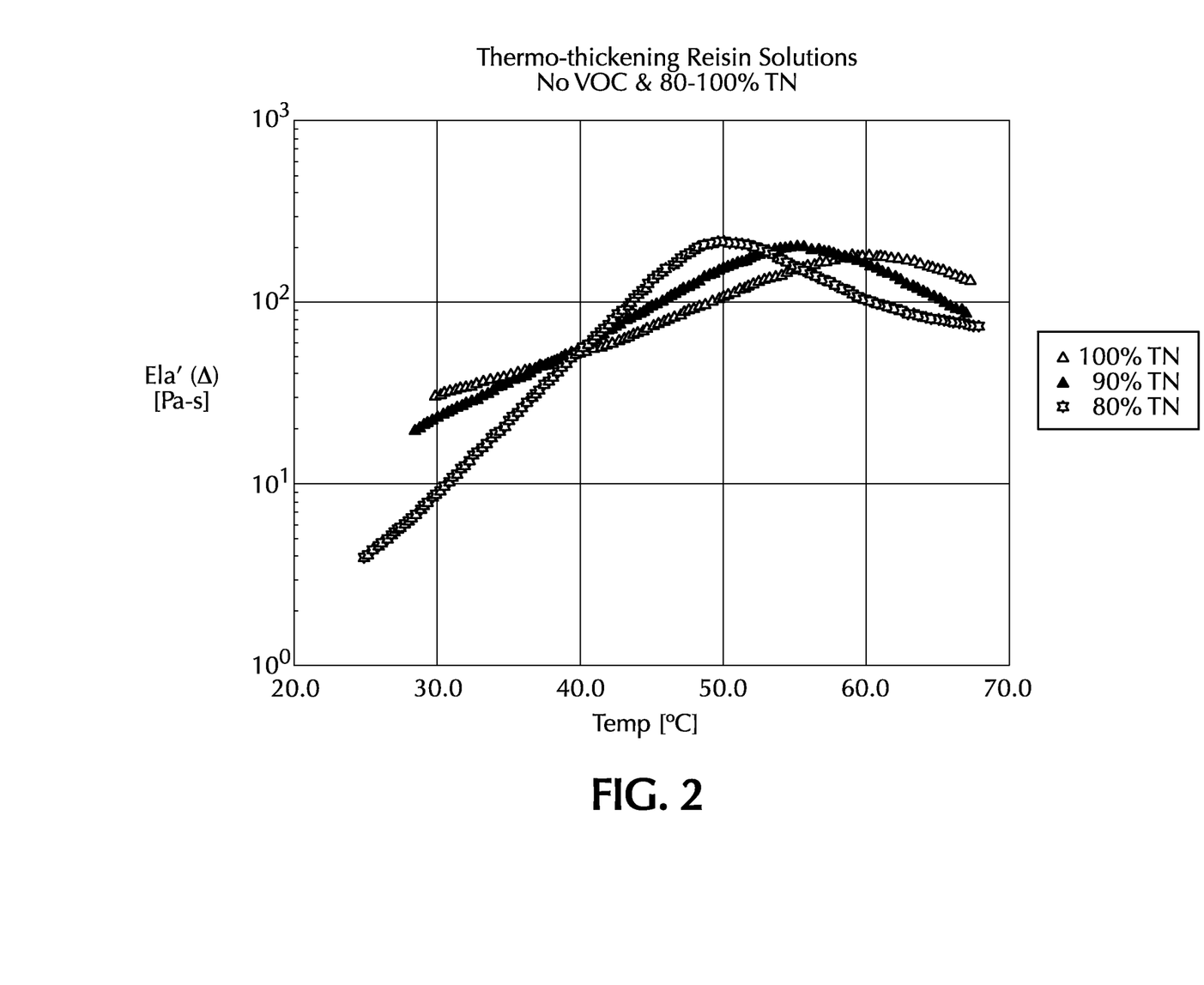
FIG. 2 is a log-plot of viscosity versus temperature of exemplary thermo-thickening resin solutions having no volatiles and a total neutralizations of 80, 90, and 100%.
Figure 3:
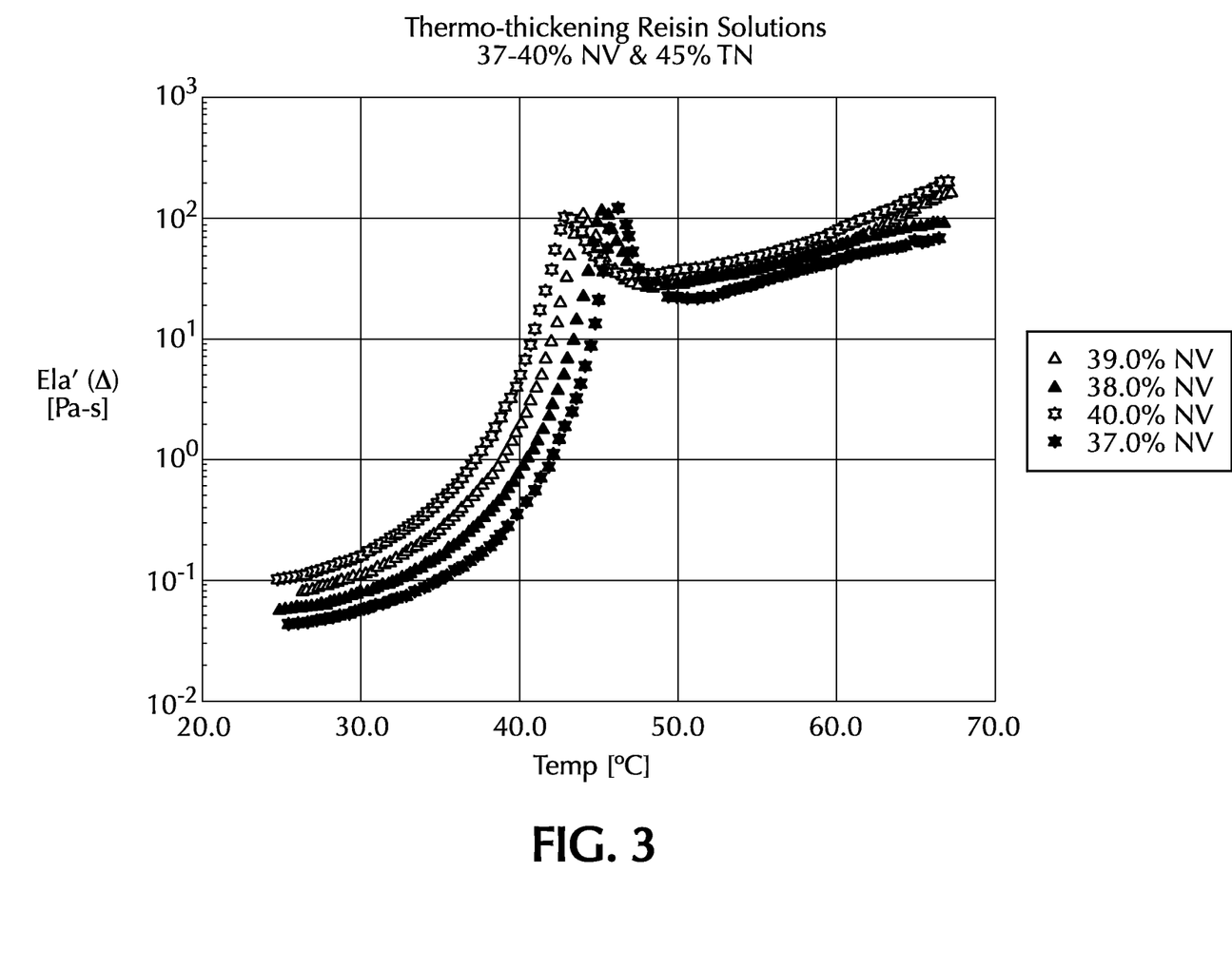
FIG. 3 is a log-plot of viscosity versus temperature of exemplary thermo-thickening resin solutions having non-volatiles of 37%, 38%, 39%, and 40% and a total neutralization of 45%.
Figure 4:
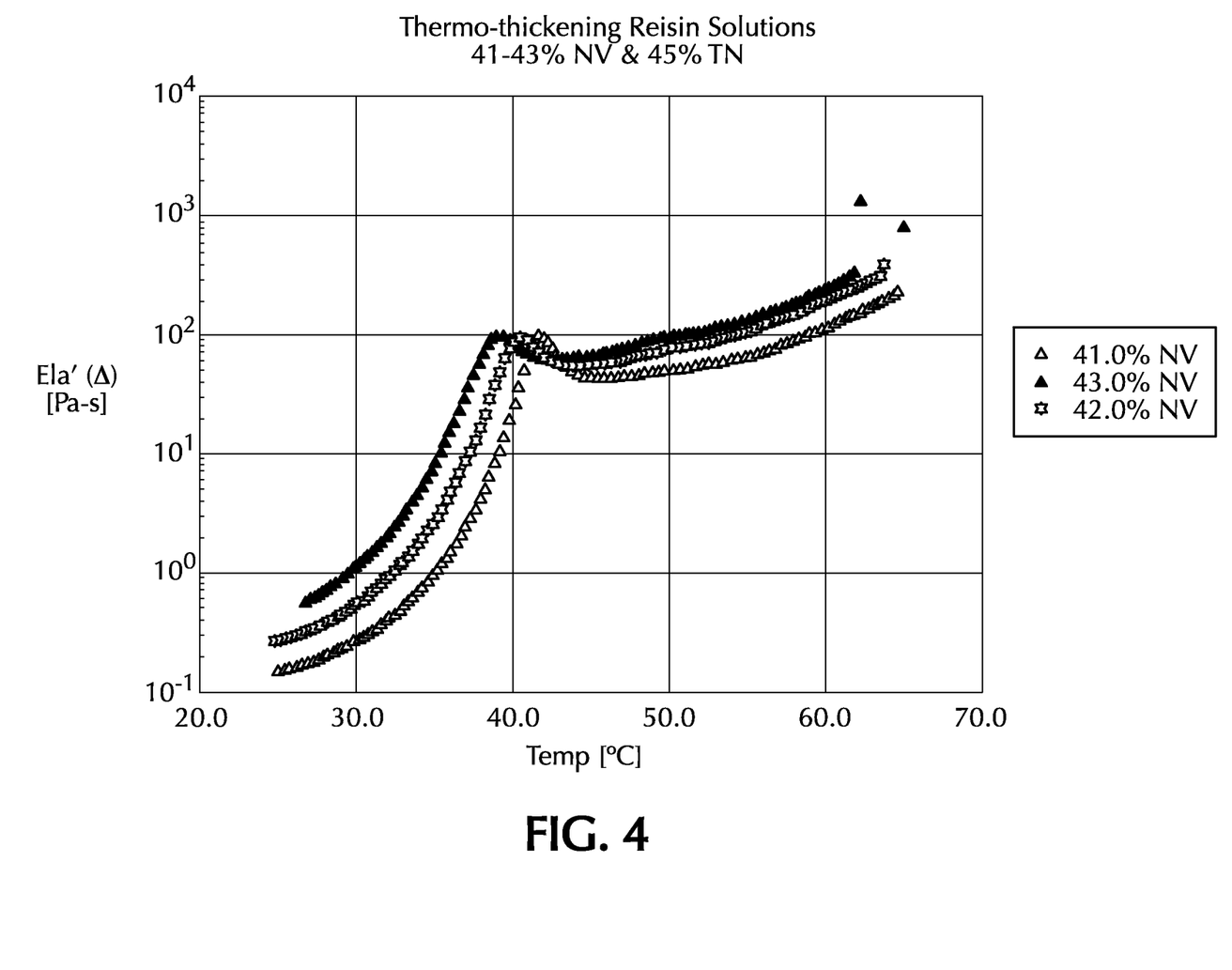
FIG. 4 is a log-plot of viscosity versus temperature of exemplary thermo-thickening resin solutions having non-volatiles of 41%, 42%, and 43% and a total neutralization of 45%.

This solution was neutralized to varying levels. FIGS. 1-2 show the resulting viscosity versus temperature log-plots for varying total neutralization (TN). This resin solution was also diluted to various non-volatile contents at a constant neutralization (45%). FIGS. 3-4 show the resulting viscosity versus temperature log-plots for varying non-volatile content and constant 45% total neutralization (TN). For this system, a neutralization of 40% or below resulted in an emulsion and not a solution.

Polymers of the resin solutions according to Example 2 are cationic, which means the polymers are positively charged when dispersed or dissolved in an aqueous solution.

Example 3

An isocyanate precursor polymer is made as follows. A difunctional isocyante (for example, isophorone diisocyanate (IP DI), 2-isocyanatopropylcyclohexyl isocyanate, 4 methylcyclohexane 1,3-diisocyanate (H-TDI) and/or 1,3-bis (isocyanatomethyl)cyclohexane), and/or a another diisocyanate (for example, 4,4'-diphenylmethane diisocyanate (MDI)) are mixed with an aromatic diol (for example, bisphenol A or 1,6 hexane diol) in an excess of the isocyanate(s) in a reaction vessel under a nitrogen ($N_2$) blanket, heating to 50-100° C., and adding a tin or bismuth catalyst to the reaction vessel. The reaction exotherms. The material is cooled and an organic solvent that is not reactive with isocyanate (for example, toluene) is added slowly. The resulting pre-polymer is isocyanate functional.

Example 4

Polyether amine is added to a reaction vessel under a nitrogen ($N_2$) blanket, heated to 90° C., and the pre-polymer of Example 3 is added in a quantity such that the polyether amine is in excess. The ingredients are then heated to about 50° C., vacuum stripped, and the solvent is collected, being held at 90-100° C. for 3-4 hours. The mixture is kept below the gel point. The resulting resin is transferred to an acetic acid and water solution to form the resin solution.

Polyurethane-type polymers of the resin solutions according to Example 4 are cationic, which means the polymers are positively charged when dispersed or dissolved in an aqueous solution.

Example 5

A resin solution comprising an anionic polymer is prepared as follows. One mole of a polyether amine is reacted with two moles of a trimellitic anhydride to form a pre-polymer, having carboxylic acid functionality. An expoxy precursor, which is a reaction product of diglycidyl ether of bisphenol A (Bis A) and Bis A, is added to the pre-polymer in a reaction vessel at 100° C. under a nitrogen ($N_2$) blanket. The equivalents ratio is about 1.4 equivalents carboxylic acid functionality to 1 equivalent of epoxy functionality. The resulting resin is transferred to an amine and water solution to form the resin solution. No cross-linking agents are present.

Polymers of the resin solutions according to Example 5 are anionic, which means the polymers are negatively charged when dispersed or dissolved in an aqueous solution.

Example 6

Figure 5:
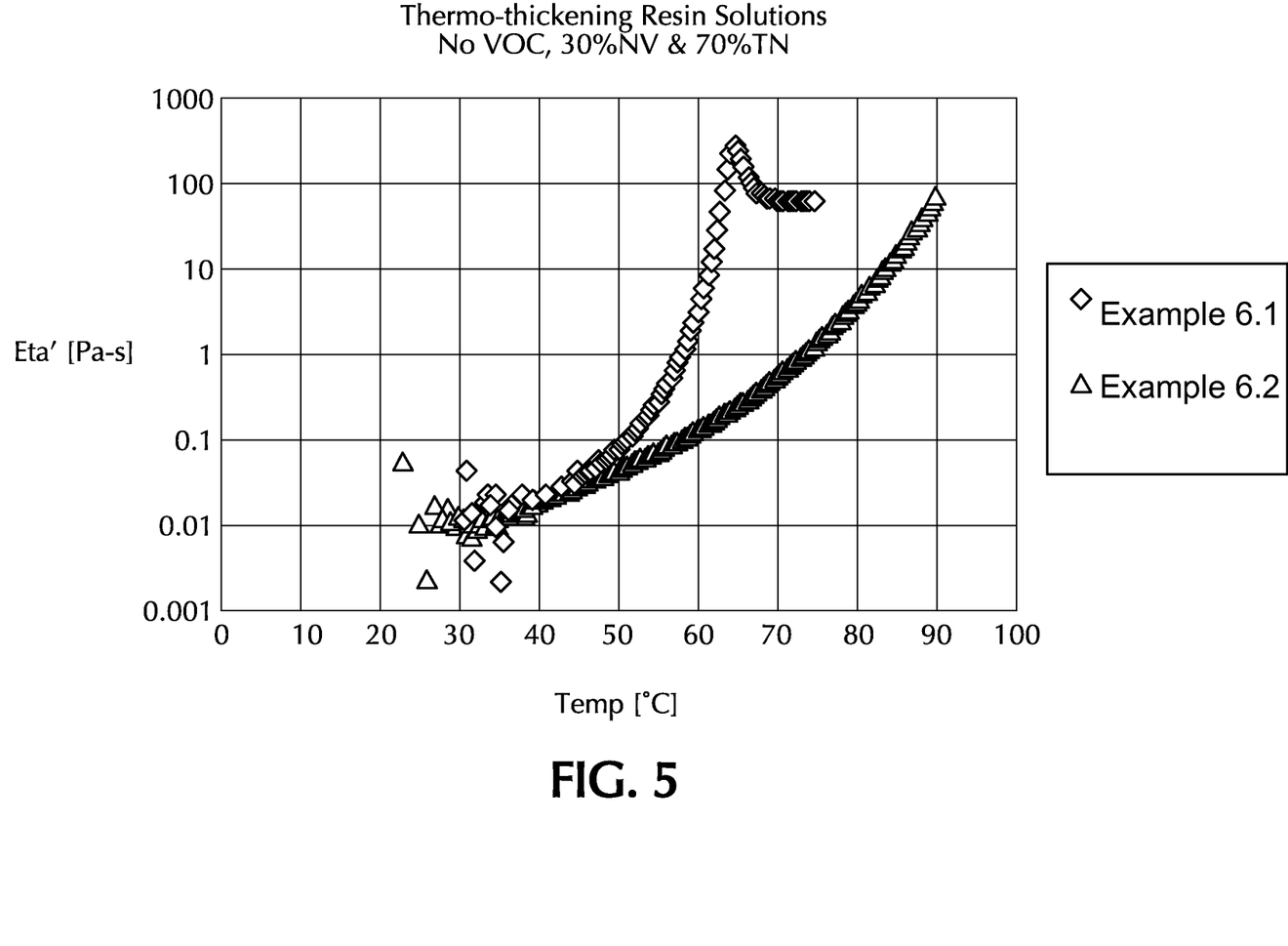
FIG. 5 is a log-plot of viscosity versus temperature of exemplary thermo-thickening resin solutions having non-volatiles of 30% and a total neutralization of 70% for two different hydrophobic to hydrophilic unit molecular weight ratios.
Figure 6:
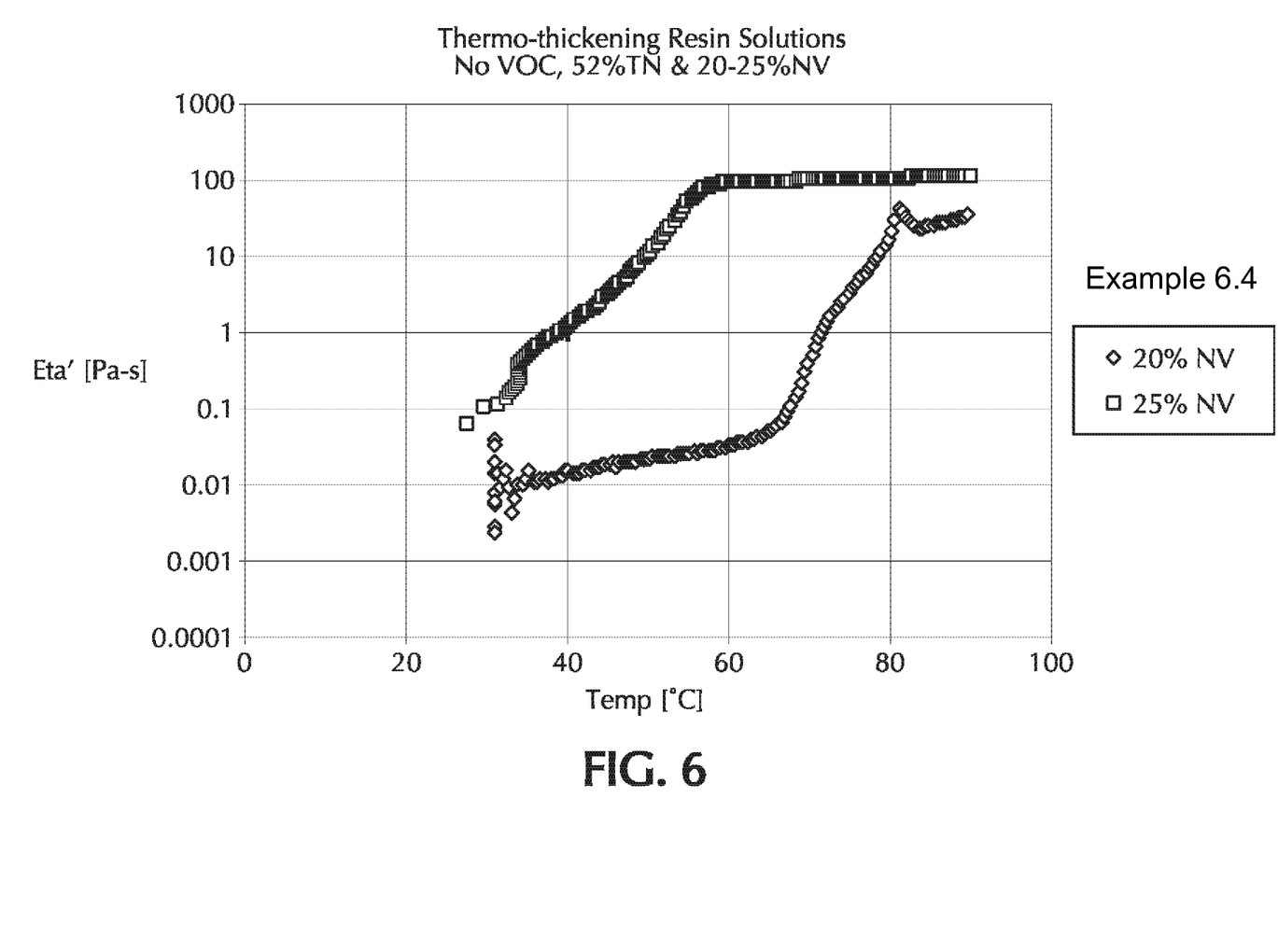
FIG. 6 is a log-plot of viscosity versus temperature of exemplary thermo-thickening resin solutions having non-volatiles of 20% and 25% and a total neutralization of 52%
Figure 7:
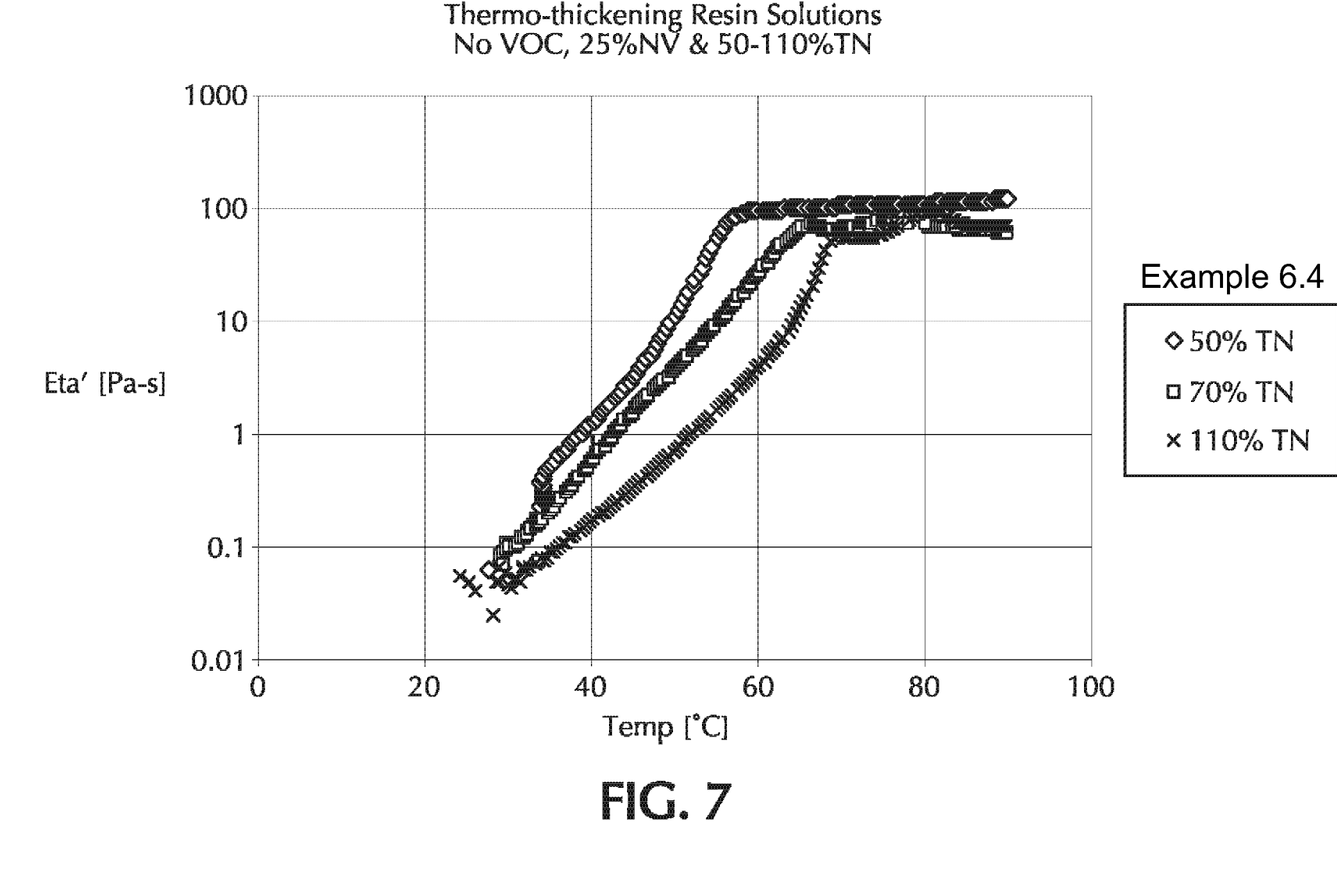
FIG. 7 is a log-plot of viscosity versus temperature of exemplary thermo-thickening resin solutions having a non-volatile content of 25% and a total neutralization of 50%, 70%, and 110%.

The resin solution of Example 2 utilizing the resin formed from polyether amine and the epoxy precursor polymer comprising the precursor of diglycidyl ether of bisphenol A and Bis A was adjusted to a concentration of 30% NV and 70% neutralization to form Example 6.1. Additional resins were made also as described in Example 2 using hydrophobic and hydrophilic units of different molecular weights relative to Example 6.1 as shown in Table 1. For Example 6.2, the epoxy precursor polymer was replaced with only the diglycidyl ether of bisphenol, and FIG. 5 shows the viscosity versus temperature log-plots for Examples 6.1 and 6.2. In FIG. 5, use of a shorter (lower molecular weight) hydrophobic unit (Example 6.2), which results in a more hydrophilic polymer, shows that the temperature range over which thermo-thickening performance was achieved is extended or broadened relative to the longer (higher molecular weight) hydrophobic unit. At 30% NV, the thermal-thickening temperature where the maximum viscosity occurred for Example 6.1 was at about 60-65° C. For Example 6.2, no maximum viscosity was reached under the testing conditions, but a maximum viscosity is expected to occur at >90° C. For Example 6.3, the polyether amine of Example 6.1 was replaced with a higher molecular weight polyether amine, and FIG. 6 shows the viscosity versus temperature log-plots for Example 6.3 at 52% total neutralization (TN) and non-volatile (NV) contents of 20% and 25%. For 20% NV, the thermal-thickening temperature where the maximum viscosity occurred at about 80° C. For 25% NV, the thermal-thickening temperature where the maximum viscosity occurred at about 55-60° C. Additionally, the 25% non-volatile (NV) content having the higher molecular weight polyether amine of Example 6.3 was neutralized to varying levels, and FIG. 7 shows the viscosity versus temperature log-plots for varying total neutralization (TN), including above 100% neutralization. The thermo-thickening temperature for 50% TN was about 55-60° C.; for 70% TN it was about 65° C.; and for 110% TN it was about 70° C.

| Example | Approximate Molecular Weight ($M_n$) of Hydrophobic Unit | Approximate Molecular Weight ($M_n$) of Hydrophilic Unit | Hydrophobic to Hydrophilic $M_n$ ratio | Shown in FIG(s). |
|---|---|---|---|---|
| 6.1 | 1000 | 2000 | 0.5 | 5 |
| 6.2 | 340 | 2000 | 0.17 | 5 |
| 6.3 | 1000 | 4000 | 0.25 | 6, 7 |

It is understood from Table 1 that another possible formulation would be: 340 $M_n$ hydrophobic unit and 340 $M_n$ hydrophilic unit. Another possible formulation would be: 4000 $M_n$ hydrophobic unit and 400 $M_n$ hydrophilic unit.

The temperature at which the maximum viscosity can be achieved may be tailored based on NV content, neutralization, and/or hydrophobic to hydrophilic unit $M_n$ ratios.

Example 7

Figure 8:
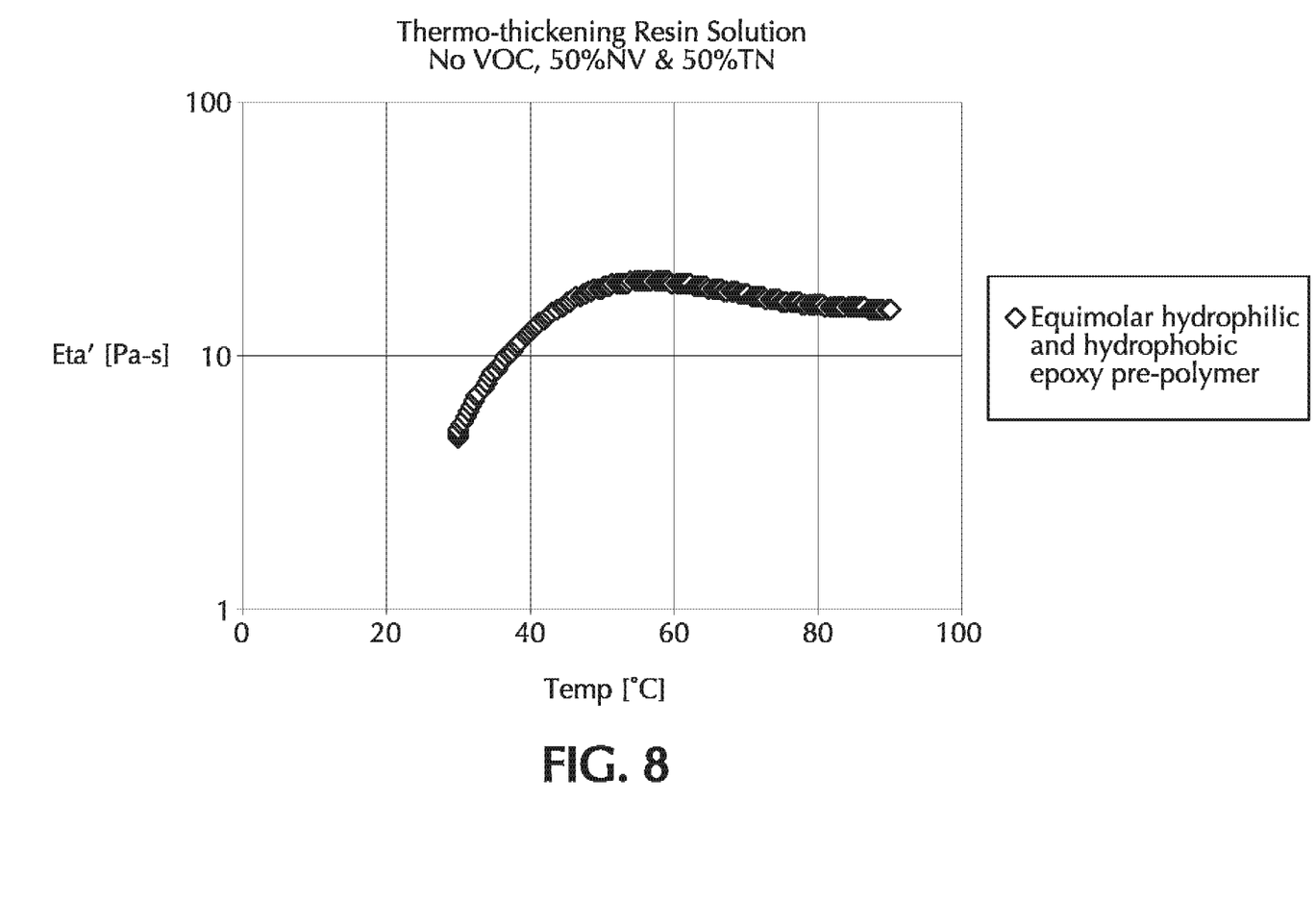
FIG. 8 is a log-plot of viscosity versus temperature of an exemplary thermo-thickening resin solution having no volatiles, a non-volatiles of 50%, and a total neutralization of 50%.

A resin system similar to Example 2 was made via the following modification: ½ (by equivalence) of the hydrophobic pre-polymer of Example 1 was added to the reaction vessel. A hydrophilic epoxy resin was added at an equal equivalence as the pre-polymer of Example 1. That is, the epoxy prepolymer was equimolar with respect to hydrophilic and hydrophobic content (and its hydrophobic to hydrophilic MW ratio was 1). The amine:epoxy equivalents ratio was kept at 1.36:1. The method used in Example 2 was followed to generate a resin solution. The resulting viscosity versus temperature log-plot is shown in FIG. 8, where the thermo-thickening temperature was about 50° C. and the viscosity curve was flattened out relative to resin systems prepared with a hydrophobic to hydrophilic MW ratio of less than 1.

Example 8

Comparative

For this comparative example, the polyether amine of Example 6.1 was replaced with a lower molecular weight polyether amine. Thus, the approximate number average molecular weight of the hydrophobic unit ($M_n$) was 1000 and $M_n$ of the hydrophilic unit was 400. The hydrophobic to hydrophilic $M_n$ ratio was 2.5. Use of a shorter (lower molecular weight) hydrophilic unit resulted in a more hydrophobic polymer, resulting in no thermo-thickening performance.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. An aqueous thermo-thickening resin solution for a non-coating application, comprising:
   a resin comprising a hydrophobic unit and a hydrophilic unit, wherein a ratio of a number average molecular weight of all of the hydrophobic units to all of the hydrophilic units in the resin is less than 2.5 and wherein the resin is a reaction product consisting of:
   (A) an epoxy pre-polymer, consisting of, in reacted form an aromatic polyol, which is bisphenol A (Bis A), an epoxy functional material, which is diglycidyl ether of bisphenol A (DGEBA), and optionally a catalyst, and (B) a di- or polyamine, which is a polyether amine; water; and optionally, a salting component;

the solution being substantially free of a cross-linking agent;

wherein the solution exhibits a reversible dynamic viscosity increase of at least 100 times in a temperature range from 20° C. to <100° C. at ambient pressure.

2. The aqueous thermo-thickening resin solution of claim 1, wherein the salting component is present and is at least one selected from the group consisting of organic acids, mineral acids, and nitrogen-containing compounds.

3. The aqueous thermo-thickening resin solution of claim 1, comprising by weight:

the reaction product in the range of 0.5-60%;

water in the range of 40-99.5%; and organic volatiles in the range of 0-25%;

wherein the percent neutralization is in the range of 40-110%.

4. A temperature-sensitive product, comprising:

the aqueous thermo-thickening resin solution of claim 1; and a carrier for the aqueous thermo-thickening resin solution.

5. The temperature-sensitive product of claim 4, wherein the carrier comprises a liquid-impermeable pouch or a plurality of shells of microcapsules; and wherein a surface of the product becomes more supportive upon contact with a living body.

6. The temperature-sensitive product of claim 4, wherein the carrier comprises another liquid; and wherein the product thickens during use at temperatures elevated from ambient temperature.

7. The temperature-sensitive product of claim 6, that is an industrial fluid and the resin of the aqueous thermo-thickening resin solution is effective as a rheology control agent.

8. The temperature-sensitive product of claim 4, that is effective to absorb energy, thereby providing protection to an item in its proximity.

9. A method of absorbing energy, the method comprising:

obtaining the temperature-sensitive product of claim 4; and associating the temperature-sensitive product with an item in the proximity of the temperature-sensitive product such that upon contact with an energy source, the temperature-sensitive product thickens and the item remains substantially intact.

10. A method of providing a temperature-sensitive product for a non-coatings application, the method comprising:

obtaining the aqueous thermo-thickening resin solution of claim 1;

incorporating the aqueous thermo-thickening resin solution with a carrier; and forming the temperature-sensitive product whose structure changes upon a temperature change to 40–<100° C. at ambient pressure.

11. The aqueous thermo-thickening resin solution of claim 1, wherein the ratio of the number average molecular weight of all of the hydrophobic units to all of the hydrophilic units in the resin is from 0.01 to 0.99.

12. The aqueous thermo-thickening resin solution of claim 1, wherein the ratio of the number average molecular weight of all of the hydrophobic units to all of the hydrophilic units in the resin is from 0.20 to 0.75.

13. A method of making an aqueous thermo-thickening resin solution for a non-coating application, the method comprising:

(I) forming a resin comprising a hydrophobic unit and a hydrophilic unit, wherein a ratio of a number average molecular weight of all of the hydrophobic units to all of the hydrophilic units in the resin is less than 2.5 and wherein the resin is a reaction product consisting of:

(A) an epoxy pre-polymer, consisting of, in reacted form, an aromatic polyol, which is bisphenol A (Bis A), an epoxy functional material, which is diglvcidvl ether of bisphenol A (DGEBA), and optionally a catalyst, and (B) a di- or polyamine, which is a polyether amine; and (II) dissolving the resin in water, and optionally, a salting component, in the substantial absence of a cross-linking agent;

thereby forming the aqueous thermo-thickening resin solution that exhibits a reversible kinematic viscosity increase of at least 100 times in a temperature range of 20° C. to <100° C. at ambient temperature.

* * * * *

UNITED STATES PATENT AND TRADEMARK OFFICE
CERTIFICATE OF CORRECTION

PATENT NO. : 10,538,664 B2
APPLICATION NO. : 15/511051
DATED : January 21, 2020
INVENTOR(S) : Charles L. Tazzia et al.

Page 1 of 2

It is certified that error appears in the above-identified patent and that said Letters Patent is hereby corrected as shown below:

In the Specification

Column 4, Line 25, "52%" should read -- 52%; --;

Column 6, Line 12, "footware" should read -- footwear --;

Column 6, Lines 66-67, "1,1-bis(4hydroxyphenylene)ethane" should read
-- 1,1-bis(4-hydroxyphenylene)ethane --;

Column 7, Line 1, "1,1-bis(4hydroxyphenyl)isobutane" should read
-- 1,1-bis(4-hydroxyphenyl)isobutane --;

Column 7, Line 5, "dihydroxynaphthylenes" should read -- dihydroxynaphthalenes --;

Column 7, Lines 16-17, "cylcohexanedicarboxylic" should read -- cyclohexanedicarboxylic --;

Column 7, Lines 54-55, "dihydroxynaphthylenes" should read -- dihydroxynaphthalenes --;

Column 8, Line 47, "(g/ml)" should read -- (g/ml); --;

Column 11, Line 22, "polyamine" should read -- polyamine. --;

Column 12, Line 35, "isocyante" should read -- isocyanate --;

Column 12, Line 36, "IP DI" should read -- IPDI --;

Column 13, Line 2, "expoxy" should read -- epoxy --;

Signed and Sealed this
Eighteenth Day of August, 2020

Andrei Iancu
*Director of the United States Patent and Trademark Office*

In the Claims

Column 16, Line 32, Claim 13, "diglvcidvl" should read -- diglycidyl --.